INVENTOR.
Philip M. Rothwell
BY Harness & Harris
ATTORNEYS

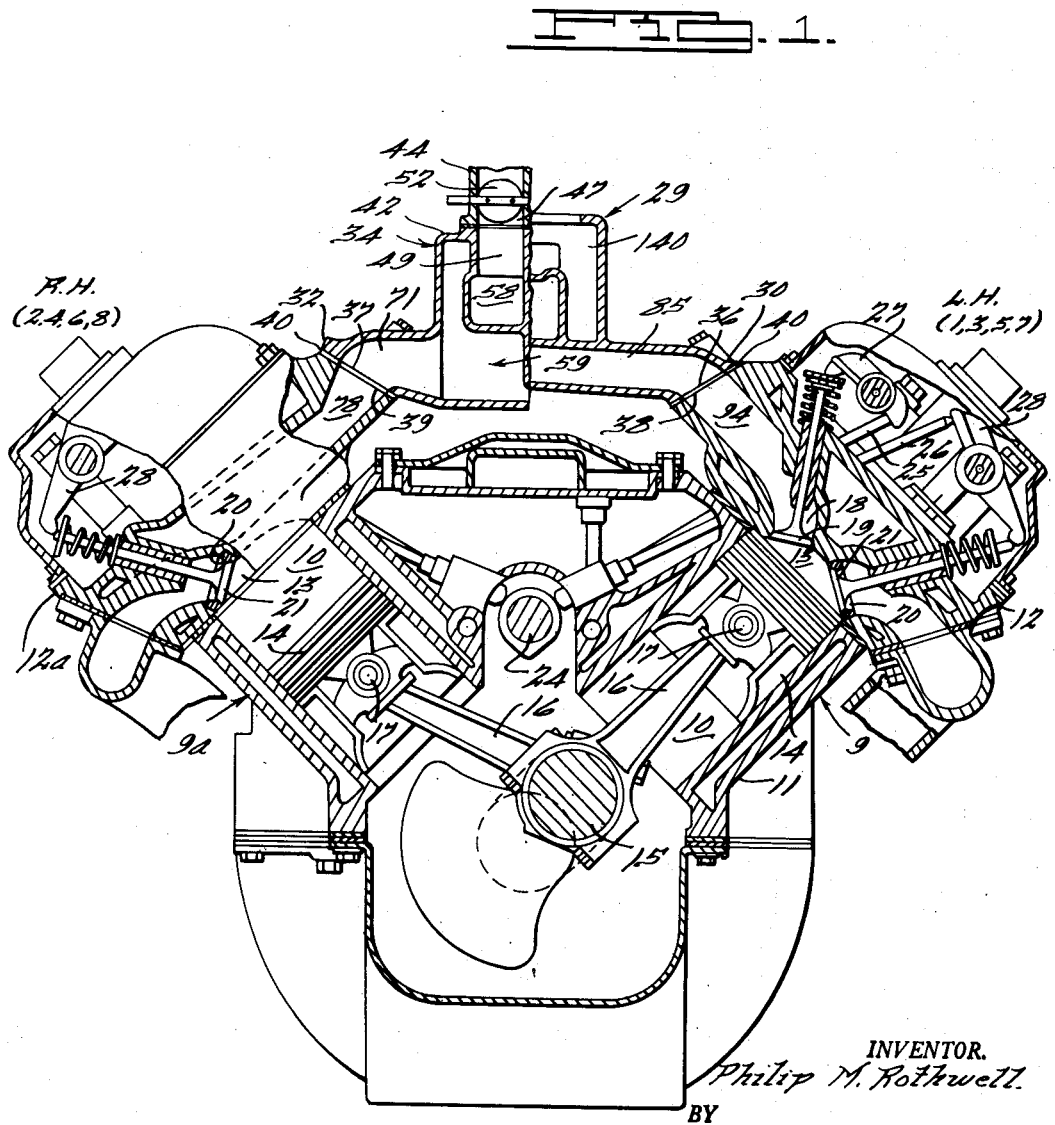

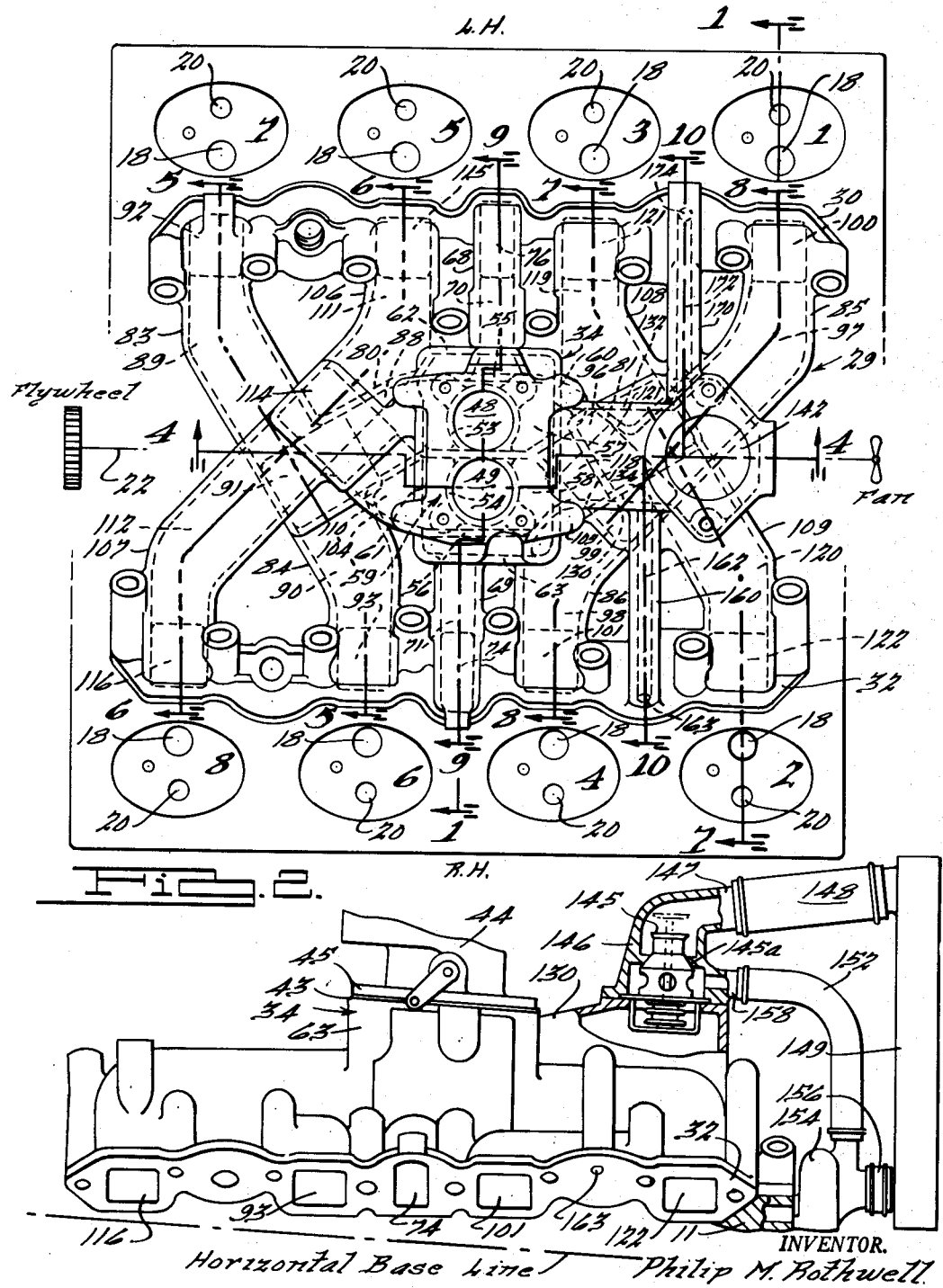

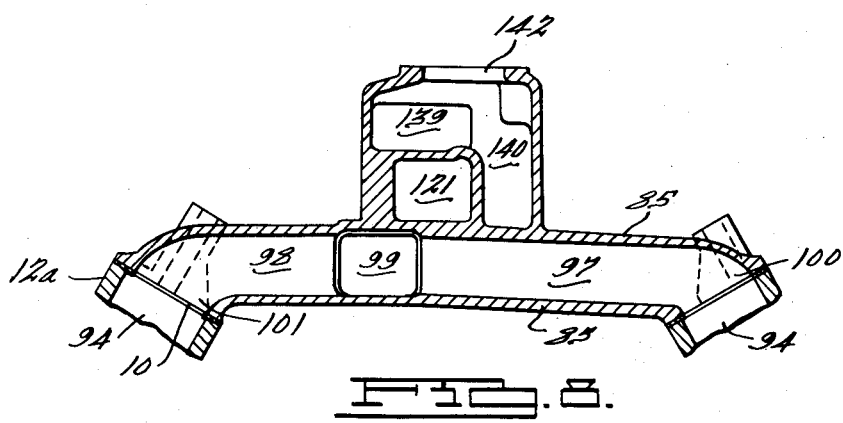
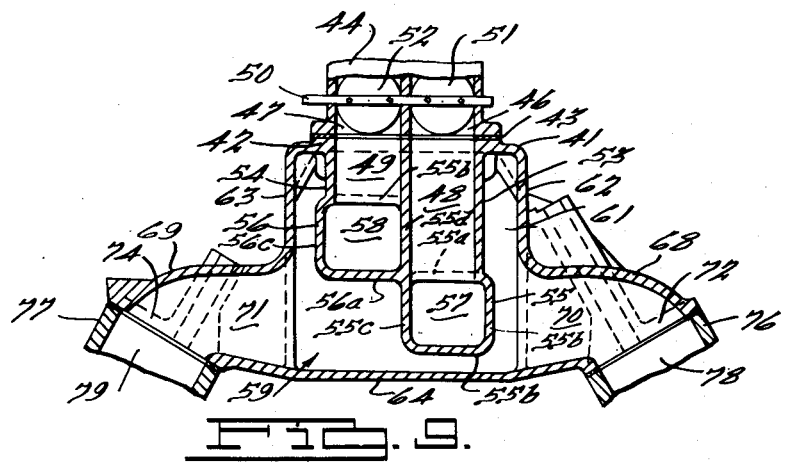
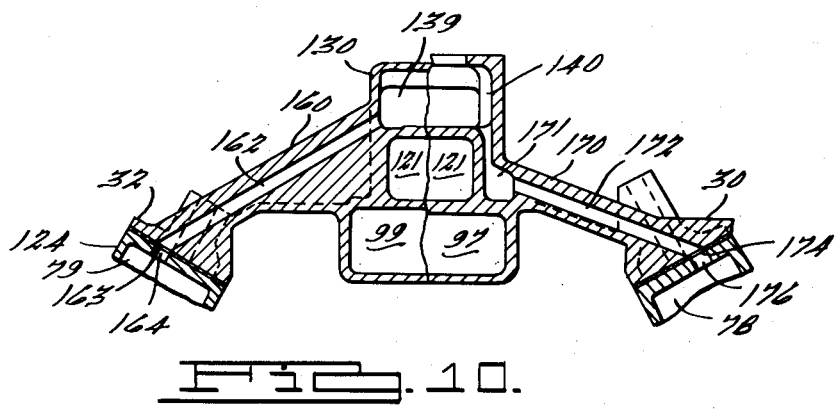

United States Patent Office 2,716,399
Patented Aug. 30, 1955

2,716,399

WATER HEATED MANIFOLD

Philip M. Rothwell, Detroit, Mich., assignor to Chrysler Corporation, Highland Park, Mich., a corporation of Delaware Application August 4, 1954, Serial No. 447,805

9 Claims. (Cl. 123—122)

This invention relates to intake manifold structures for engines having opposed banks of cylinders and to manifolds of this character which include means for effectively utilizing engine coolant liquid for heating the air-fuel mixture. It especially relates to manifolds of this type having centrally located air-fuel mixture intake distribution means and to the heating thereof.

My invention will be described by way of illustration as applied to a form of intake manifold of current manufacture for water cooled V–8 engines which manifold has overlapping air-fuel distribution conduits and is fed by air-fuel supply means in the form of a dual carburetor. As shown in the copending application of Carpentier et al. Serial No. 283,198, filed April 19, 1952, and now Patent No. 2,686,506, granted August 17, 1954, in such a manifold each barrel of the carburetor serves to feed two inner cylinders of one bank of the engine and two outer or end cylinders of the other bank of the engine through the distribution conduits from a distribution zone at the base of an intake riser forming a continuation of the carburetor barrel. It will be understood, however, that my invention is applicable to other engines of the type having opposite banks of cylinders and having a greater or lesser number of cylinders; to other manifold systems, and to manifolds fed by one or more single or multiple barrel carburetors or other supply means.

Heating of the intake manifold by the coolant liquid of the engine has definite advantages where time of warm-up is not critical, for example as in the case of trucks and industrial engines. It can utilize the existing coolant liquid circulating system of the cylinder heads; avoid the need of exhaust gas crossover passages in the cylinder heads, and may take advantage of the refrigeration effect of the air-fuel mixture on the liquid coolant to thereby reduce the heat rejection of the liquid coolant, for instance water, or anti-freeze solutions necessary at the radiator.

In order to heat an engine manifold of the above type having a centrally located dual carburetor, it is necessary to heat the central section of the manifold and to this end I provide a water crossover passage having end connections with the water galleries of the cylinder heads, this crossover passage having intermediate its length a water compartment which jackets the intake risers and distribution zones of the manifold. I have discovered that an arrangement of this kind tends to produce occasional hot spots in the cylinder heads of the engine and to adversely affect its performance when this occurs. It is believed that these hot spots are caused by the formation of air or steam pockets in the cylinder heads of the engine due to the diversion of substantial quantities of water from the water galleries of the cylinder heads to the water crossover passage aforesaid at the central longitudinal portions of the cylinder heads. I have further discovered that the aforesaid difficulty may be substantially alleviated or even entirely eliminated by providing so-called bleed passages between the water galleries of the engine cylinder heads and the water return means of the manifold water compartment adjacent the high ends of the cylinder heads and manifold. In this connection I have found that in an engine of the foregoing character wherein I provide a manifold having a central water crossover passage and water compartment operable between the opposite cylinder heads for heating the riser distribution zone of the manifold by hot water received from the latter, and a longitudinal return passage extending from the heating compartment to the high end of the engine where it may connect with the radiator and pump return, that such operate satisfactorily where each cylinder head water gallery has a supplemental connection between it and the water return passage of the manifold adjacent the high point of the engine. These supplemental passages or connections should be smaller than the crossover passages feeding the water compartment of the manifold in order to avoid bypassing of water from the water compartment of the manifold and consequent loss of heat to the distribution zone of the latter. Preferably, these supplemental connections will comprise the smallest tubular passages capable of bleeding entrapped air or steam from the cylinder heads into the water return system or, stated otherwise, the smallest passage capable of avoiding the formation of hot spots in the cylinder heads. The size of these passages may readily be determined experimentally with each manifold by taking thermocouple readings at critical points in the water circulatory system of the cylinder heads where hot spots are apt to occur until a passage size is obtained providing a substantially uniform temperature of the circulating water.

The principal object of my invention is, therefore, to provide engines having opposed banks of cylinders with an intake manifold in which the distribution zone of the intake riser of the manifold is heated by the engine coolant liquid for normal operation and for reducing the heat rejection of the coolant liquid at the radiator.

Another object is to provide V engines with an intake manifold in which the intake riser passage and distribution zone at the base thereof are water heated for normal operation and for reducing the heat rejection of the water at the radiator.

A further object is to provide means for heating the intake distribution zone of V engine intake manifolds by means utilizing the circulatory liquid coolant of the cylinder heads and which means includes provision for bleeding air or vapor collected in the circulatory system of the cylinder heads.

A specific object is to provide a liquid coolant heating system for V–8 manifolds employing a centrally located dual carburetor which includes means for conducting coolant liquid from the cylinder head circulatory system to the mid-section of the manifold adjacent the distribution zone of the intake risers thereof, together with means for returning the liquid coolant to the engine radiator and pumping means, and means for connecting the liquid coolant return means of the manifold and the circulatory system of the cylinder heads adjacent the high ends thereof with air and vapor bleed means or passages.

Other objects and advantages of my invention will be apparent from the following description of a preferred embodiment of my invention applied to a V–8 engine of current manufacture having a 331 cu. in. capacity utilizing an intake manifold mounting a centrally located dual carburetor, reference being had to the accompanying drawings wherein:

Figure 1 is an end elevational view partly in section of an 8-cylinder V–type overhead valve engine embodying the novel features of my invention, the section through the manifold being taken at approximately 1—1 of Figure 2;

Figure 2 is a plan view of a manifold of the engine of

Figure 4:
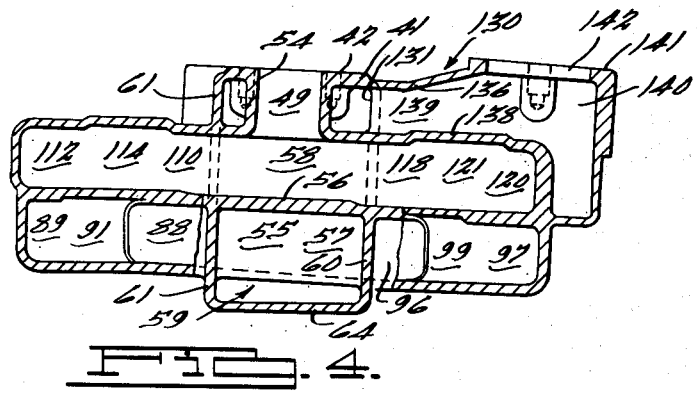
Figure 5:
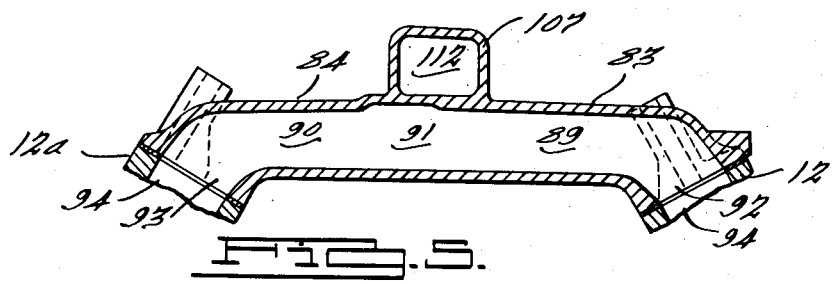
Figure 6:
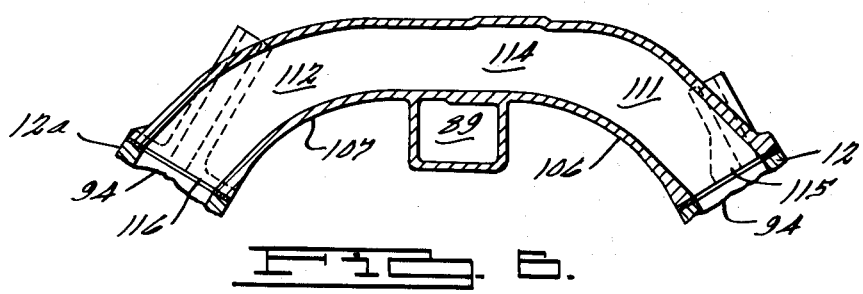
Figure 7:
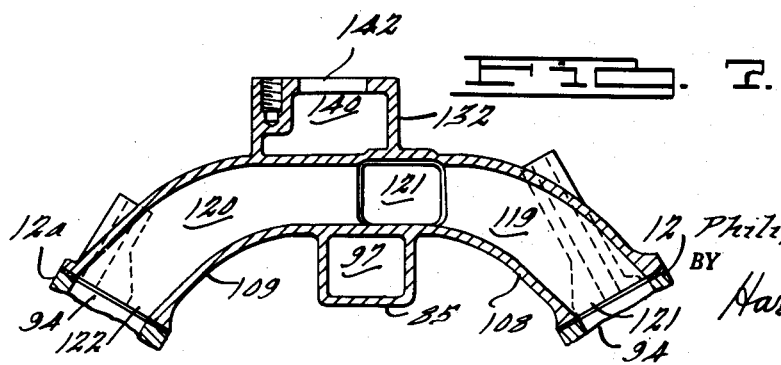

Figure 1 to which my invention has been applied, this figure schematically showing the banks of cylinders in relation thereto;

Figure 3 is a side elevational view of the manifold of Figure 2 placed in reference to the horizontal base line or plane of a vehicle and showing a portion of a carburetor mounted thereon and part of the liquid coolant circulatory system;

Figure 4 is a longitudinal section taken at 4—4 of Figure 2 showing portions of the air-fuel passages and showing part of the coolant liquid passage and compartment for heating the intake riser and its distribution zone;

Figures 5 and 6 are transverse sections taken respectively at 5—5 and 6—6 of Figure 2 through certain air-fuel passages of the manifold;

Figures 7 and 8 are transverse sections through other air-fuel passages of the manifold of Figure 2 and illustrating part of the hot liquid coolant return passage, these sections being taken respectively at 6—6 and 7—7 of Figure 2;

Figure 9 is a transverse section through the intake riser section of the manifold of Figure 2 illustrating the surrounding coolant liquid heating compartment which jackets the same and which shows the crossover passages between the coolant liquid galleries of the cylinder heads and the riser coolant liquid heating compartment, this section being taken at 9—9 of Figure 2; and Figure 10 is a transverse section taken at 10—10 of Figure 2 showing the air and vapor bleed connections between the hot coolant liquid return means of the manifold of Figure 2 and the coolant liquid galleries of the opposite cylinder heads of the engine.

Referring now to the drawings wherein similar numerals are used to designate similar parts of the manifold structure and system of my invention I have, as stated above, illustrated my invention as applied to a 90°, water cooled V-8 engine of current manufacture. This engine has a so-called two-plane 90° crankshaft, hemispherical combustion chamber and is provided with a dual barrel carburetor of the downdraft type, each barrel of the carburetor being arranged to feed a pair of inner cylinders of one bank of the engine and a pair of outer or end cylinders of the opposite bank of the engine.

As seen in the drawings, especially Figures 1 and 2, the engine has two banks 9 and 9a of cylinders 10, four in each bank, arranged at 90° in a cylinder block 11, to which cylinder heads 12 and 12a are secured and provided with hemispherical type combustion chambers 13 immediately above each cylinder 10. The cylinders of each bank are preferably aligned longitudinally of the engine and the cylinders of the opposite banks are offset longitudinally relative to each other.

For convenient reference, the cylinders of the left hand cylinder bank, which is to the left looking forward from the flywheel end of the engine are numbered 1, 3, 5, and 7 respectively, starting such numbering at the fan end of the engine, and those of the right hand cylinder bank are numbered 2, 4, 6, and 8 respectively, these numbers appearing internally of the cylinder representations in Figure 2.

Each cylinder is provided with a piston 14 reciprocable therein and operatively connected to a crankshaft 15 by a connecting rod 16 and wrist pin 17. Crankshaft 15 may be of any of the conventional types, but preferably is an inherently balanced shaft, for example, a 90° two-plane crankshaft having double crank throws arranged 90° apart.

The hemispherical combustion chambers 13 of the cylinders 10 are by prefernce each provided with a single inlet opening or port 18 closed by an inlet valve 19 and with a single smaller exhaust outlet or port 20 closed by an exhaust valve 21, these valves being arranged transversely of the longitudinal axis 22 of the engine and at a substantial angle, for instance, 60° to each other, and preferably on a great arc of the spherical segment forming the combustion chamber 13. As seen in Figure 2, all of the inlet openings 18 are in longitudinal alignment and all of the exhaust openings 20 are similarly arranged.

The inlet and exhaust valves of both banks of the engine are operable from a single camshaft 24 located above the crankshaft 15, the camshaft actuating suitable tappet mechanism associated with the push rods 25 and 26 of the inlet and exhaust valve mechanisms respectively, which in turn actuate respectively the inlet valve rocker arms 27 and exhaust valve rocker arms 28, these rocker arms actuating in turn the normally spring held closed valves 19 and 21.

As seen more particularly in Figures 1, 2, 4, and 9, the intake manifold 29 of my invention comprises left and right side mounting or flange portions 30, 32 connected by conduit means to be described with a centrally located carburetor mounting and water jacketed air-fuel distribution section 34.

The side mounting portions 30, 32 extend longitudinally of the engine and have bottom converging mounting faces 36, 37 arranged at an angle of about 120° to each other which seat upon the inner supporting faces 38, 39 of the cylinder heads 12, 12a respectively with intervening gaskets 40.

The central section has a top wall 41 provided with a mounting pad 42 on which is secured with intermediate gasket means 43 a carburetor 44. Any means such as bolts (not shown) may secure the carburetor mounting flange 45 to the pad 42.

The carburetor is of the dual barrel type having (see Figure 9) transversely arranged vertical barrels or passages 46, 47 from which gas or air-fuel mixture may be delivered to vertical intake riser passages 48, 49 which open through the pad 42 of the central section to form continuations of the barrels 46, 47. The amount of gas or air-fuel delivered is controlled by a throttle member 50 having throttle blades 51, 52 located in the carburetor barrels 46, 47 and which are adapted to assume predetermined positions in these barrels between fully open to fully closed throttle The intake riser passages 48, 49 are preferably of cylindrical shape defined (Figure 2) by cylindrically walled conduits 53, 54 which extend downwardly from the top wall 41 to intersect with short conduit portions 55, 56 of rectangular section providing riser distribution chambers or zones 57, 58 into which the intake riser passages 48, 49 respectively open.

It will be seen from Figure 9 that the conduit 55 is in a lower plane than the conduit 56 and such that the upper wall 55a of the first is substantially in the same plane as the lower wall 56a of the other to facilitate crossing of the passages emanating from these conduits as will hereinafter be evident. The conduit 55 also has a bottom wall 55b, an inner side wall 55c, and an outer side wall 56a. The conduit 56 also has a top wall 55b, an outer side wall 56c, and an inner side wall 56d in the same vertical plane as the wall 55c.

A water compartment generally designated by numeral 59 jackets the intake riser conduits 53, 54 and their distribution chambers 57, 58 provided by the conduits 55, 56 and comprises vertical transverse walls 60, 61 and vertical longitudinally extending walls 62, 63 extending downwardly from the top wall 41 and connecting with a bottom generally horizontal wall 64 spaced from the conduits 55, 56.

As seen in Figures 1, 2, and 9, cross or transversely extending conduits 68, 69 connect the water compartment 59 with the side mounting flanges by passages 70, 71, these passages terminating in openings 72, 74 in the mounting flanges coinciding and connecting with passages 76, 77 of the water jackets or galleries 78, 79 of the cylinder heads intermediate the middle cylinders 3 and 5 of the left bank and 4 and 6 of the right bank.

The lower short horizontal conduit 55 is connected at its opposite ends by main conduits 80, 81 which are longitudinal continuations of the conduit 55, these conduits turning obliquely outwardly toward the right hand cylinder bank and connecting with substantially right angle branch conduits 83, 84, and 85, 86 which extend generally horizontally and then turn outwardly and downwardly to connect with the side mounting flanges 30, 32, the conduits 83, 84, 85, 86 terminating opposite the cylinders 7, 6, 1, and 4 respectively. The main conduit 80 provides a main passage 88 which connects with branch passages 89, 90 of the conduits 83, 84 in a distribution chamber or zone 91, the passages 89, 90 terminating in openings 92, 93 connecting with the intake passages 94 of the cylinders 7 and 6 respectively. The conduit 81 provides a main passage 96 which connects with the branch passages 97, 98 of the conduits 85, 86 in a distribution chamber or zone 99, the passages 97, 98 terminating in openings 100, 101 connecting with the intake passages 94 of the cylinders 1 and 4 respectively.

The upper short horizontal conduit 56 is connected at its opposite ends by main conduits 104, 105 which are longitudinal continuations of the conduit 56, these conduits turning obliquely outwardly toward the left hand cylinder bank and connecting with substantially right angle branch conduits 106, 107 and 108, 109 which extend generally horizontally and then turn outwardly and downwardly to connect with the side mounting portions 30, 32, the conduits 106, 107, 108, 109 terminating opposite the cylinders 5, 8, 3 and 2 respectively. The conduit 104 provides a main passage 110 which connects with branch passages 111, 112 of the branch conduits 106, 107 in a distribution chamber or zone 114, the passages 111, 112 terminating in openings 115, 116 connecting with the intake passages 94 of the cyplinders 5 and 8 respectively. The main conduit 105 provides a main passage 118, which connects with branch passages 119, 120 of the branch conduits 108, 109 in a distribution chamber or zone 121, the passages 119, 120 terminating in openings 121, 122 connecting with the intake passages 94 of the cylinders 3 and 2 respectively.

It will be noted that the conduit 104 and its branch conduits 106, 107 overlie the main conduit 80 and its branch conduits 83, 84 in the area of their distribution zones 114 and 91 respectively, the branch conduits 106, 107 forming an X with the branch conduits 83, 84 in plan as seen in Figure 2. Similarly, the main conduit 105 and its branch conduits 108, 109 overlie the main conduit 81 and its branch conduits 85, 86 in the area of their distribution zones 121 and 99 respectively, the branch conduits 108, 109 forming an X with the branch conduits 85, 86 in plan as seen in Figure 2.

It will be evident that air-fuel mixture entering the riser 48 will deliver the same to the main passages 88 and 96 for delivery to the cylinders 7 and 6 and cylinders 1 and 4 through their respective branch passages. Similarly, air-fuel mixture entering the riser 49 will deliver the same to the main passages 110, 118 for delivery to the cylinders 5 and 8 and the cylinders 3 and 2 through their respective branch passages.

The water heating or so-called hot spot compartment 59 has a return conduit means 130 which extends adjacent the top thereof from an opening 131 (Figure 4) in the jacket wall 60 on the fan side of the engine and on the longitudinal axis 22 thereof. This conduit overlies the air-fuel conduit 105 and comprises side walls 132, 134, a top wall 136 (Figure 4) which is a continuation of the compartment wall 41 and a lower wall 138 common with the upper wall of the air-fuel passage, these walls defining a passage 139 of generally rectangular section. The return passage 139 opens into an enlarged chamber 140 of the return conduit means, this chamber having a top wall 141 which is provided with a water outlet or opening 142 in which a conventional bellows-type heat responsive valve 145 is located and which is mounted, as seen in Figure 3, in an elbow-like cover 146 whose walls are spaced from the valve body so as to permit free flow of water around the valve body. This cover 146 has a top outlet 147 which is opened and closed by the valve 145 at a seat 145a and connects by suitable conduit means 148 with the radiator 149 of the vehicle. The side outlet 150 connects by a bypass hose 152 with the return side of a pump 154 which also connects with the radiator return conduit 156. The pressure side of the pump directs the water to the engine cylinder block and heads.

The thermostat is operable to control the coolant liquid temperature by restricting or permitting flow of coolant fluid, in this case water, from the cylinder heads 12, 12a to the radiator 149. When the thermostat valve 145 is closed, hot coolant water from the cylinder heads and intake manifold is drawn through the bypass outlet to the pump housing intake side and recirculated through the cylinder block 11. This continues until a predetermined upper temperature is reached whereupon the thermostat opens the valve and the major portion of the water is circulated through the radiator to the pump return side.

As previously described, my invention provides for means to inhibit the formation of air or steam pockets in the water jacket of the cylinder heads of the engine which occur by reason of the water inlets 70, 71 to the water compartment 59.

As best seen in Figures 2 and 10, I provide a cross conduit 160 which extends downwardly between the return conduit 130 and the mounting flange 32. This conduit 160 defines a small tubular bleed passage 162 opening at one end into the return passage 139 and having at its opposite end a terminal opening 163 connecting with a water passage 164 opening into the water jacket or gallery 79 of the right hand bank cylinder head 12a located between the cylinders 2 and 4 at the high end of the engine.

A somewhat similar cross conduit 170 extends downwardly between the lower portion 171 of the chamber 140 of the return passage and the manifold mounting flange 30. This conduit 170 defines a small tubular bleed passage 172 opening at its high end into the chamber portion 171 and having at its lower end a terminal opening 174 connecting with a water passage 176 intermediate the cylinders 1 and 3, leading to the water jacket or gallery 78 of the cylinder head 12 of the left hand bank.

As previously noted, the bleed passages should be smaller than the water intake passages of the heating compartment. In a 331 cu. in. engine of the type described, optimum results were obtained when the bleed passage was made $5/16''$ in diameter relative to an intake passage $7/8''$ by $2\,3/32''$. This represents a ratio of areas of about 1 to 23.

In warming up a cold engine, the valve 145 will be closed such that water heated by the cylinder head combustion will be circulated by the pump 154 to the cylinder block 11 from which it is directed to heads 12, 12a, then to the manifold hot spot chamber 59 by way of the cross passages 70, 71 and returned to the pump by way of the return passage 139 bypass 152. The circulatory water directly impinges on the walls 55b, 55c, 55d, 56a, and 56b of the riser distributing zones 57, 58 and rises in the chamber 59 to circulate in contact with the cylindrical walls 53, 54 of the intake risers 48, 49 and after leaving the compartment 59 to contact the walls of the conduit 105. These surfaces take heat from the water and transfer it to the air-fuel mixture passing through the risers and distributing passages aforesaid. In the event that air or steam pockets tend to form in the cylinder heads 12, 12a the bleed passages 162, 172 between the cylinder heads and water return of the compartment 59 provide a means of escape therefor and thus prevent any interruption in smooth engine performance. When the engine is up to temperature, the valve 145 will open and the greater portion of the water will return to the pump by way of the radiator 149.

From the foregoing description of my invention it will be apparent that I have provided a novel manifold structure having effective coolant fluid heating of a centrally located air-fuel distribution zone and which inhibits the formation of hot spots in the cylinder heads of the engine. It will be understood that various changes and modifications may be made in the novel features of my invention without departing from the intent and spirit thereof and all such changes and modifications as are embraced by the appended claims and equivalents thereof are contemplated.

I claim:

1. An intake manifold for a multicylinder engine having opposite cylinder heads each of which is provided with a mounting face for said manifold, a liquid coolant gallery, passage means connecting said gallery with said mounting face and air-fuel mixture delivery passages between said mounting face and the intake valve ports of the cylinders; said manifold comprising opposite flange portions for mounting said manifold to the said mounting faces of said cylinder heads, a central portion defining air-fuel intake riser means having a bottom distribution zone, air-fuel mixture conduits connecting said central portion and said mounting portions and defining passages for conducting air-fuel mixture from said distribution zone to said delivery passages of said heads, said central portion further defining a liquid coolant compartment jacketing said riser means distribution zone, liquid coolant intake conduit means extending transversely of said manifold between said central portion and said opposite mounting portions and defining passages connecting said compartment with certain of the said passage means of said galleries at said mounting faces, liquid coolant return conduit means extending longitudinally of said manifold from said central portion to adjacent one end thereof and defining passage means for conducting liquid coolant from said compartment, and bleed conduit means extending transversely of said manifold between said return conduit means and said mounting portions and defining passage means connecting said liquid coolant return passage means with other of the said passage means of said galleries at said mounting faces.

2. An intake manifold for a multicylinder engine having opposite cylinder heads each of which is provided with a mounting face for said manifold, a liquid coolant gallery, passage means connecting said gallery with said mounting face and air-fuel mixture delivery passages between said mounting face and the intake valve ports of the cylinders; said manifold comprising opposite flange portions for mounting said manifold to the said mounting faces of said cylinder heads, a central portion defining a pair of air-fuel intake risers each having a distribution zone at its lower end, air-fuel mixture conduits connecting said central portion and said mounting portions and defining passages for conducting air-fuel mixture from said distribution zones to said delivery passages of said heads, said central portion further defining a liquid coolant compartment jacketing said riser means distribution zone, liquid coolant intake conduit means extending transversely of said manifold between said central portion and said opposite mounting portions and defining passages connecting said compartment with certain of the said passage means of said galleries at said mounting faces, liquid coolant return conduit means extending longitudinally of said manifold from said central portion to adjacent one end thereof and defining passage means for conducting liquid coolant from said compartment, and bleed conduit means extending transversely of said manifold between said return conduit means and said mounting portions and defining passage means connecting said liquid coolant return passage means with other of the said passage means of said galleries at said mounting faces.

3. An intake manifold for a multicylinder engine having opposite cylinder heads each of which is provided with a mounting face for said manifold, a liquid coolant gallery, passage means connecting said gallery with said mounting face and air-fuel mixture delivery passages between said mounting face and the intake valve ports of the cylinders; said manifold comprising opposite flange portions extending longitudinally of the engine for mounting said manifold to the said mounting faces of said cylinder heads, a central portion defining a pair of air-fuel mixture intake risers each having a distribution zone at its lower end, air-fuel conduits connecting said central portion and said mounting portions and defining passages for conducting air-fuel mixture between said distribution zones and said air-fuel mixture passages of said heads, said central portion further defining a liquid coolant compartment jacketing said intake risers and riser distribution zones, liquid coolant intake conduit means extending transversely of said manifold between said central portion and said opposite mounting portions to define passages between said compartment and the said passage means of said galleries, liquid coolant return conduit means extending longitudinally of said manifold generally centrally thereof from said central portion to adjacent one end of said manifold, said return conduit means defining passage means connecting with said compartment for conducting liquid coolant therefrom and defining a liquid coolant discharge outlet, and bleed conduit means between said return conduit means and each manifold mounting portion defining passage means connecting said return passage means with the said passage means of said galleries.

4. An intake manifold as claimed in claim 3 wherein said liquid coolant return conduit means includes a discharge chamber having said discharge outlet and said bleed passage means comprises a passage connecting the passage means of one gallery with said chamber and another passage connecting the passage means of the other gallery with said return passage means.

5. In an engine having opposite cylinder heads, each head having a liquid coolant gallery, an inner face for seating an intake manifold, and passage means connecting its coolant gallery and its manifold seating face at a first position adjacent the end of the cylinder heads corresponding to their forward end and at a second position substantially midway the ends of said heads; an intake manifold for said engine comprising opposite flange portions for mounting said manifold on said seating faces, a central portion comprising a pair of air-fuel intake risers each terminating at its lower end in a distribution zone, a liquid coolant compartment jacketing said distribution zones, liquid coolant intake conduits extending transversely of said manifold between said central portion and said flange portions and defining liquid coolant intake passages connecting said liquid coolant compartment with the said passage means of said galleries at said midway position, liquid coolant return conduit means extending longitudinally of said manifold from said central portion thereof to adjacent the end of said manifold corresponding to the forward end of said cylinder heads, said liquid coolant return conduit having an outlet and defining a liquid coolant return passage between said compartment and said outlet, and bleed conduit means adjacent said forward end of said manifold defining passage means connecting the said return passage and said passage means of said galleries.

6. In an engine having opposite cylinder heads, each head having a liquid coolant gallery, an inner face for seating an intake manifold, and passage means connecting its coolant gallery and its manifold seating face at a first position adjacent the end of the cylinder heads corresponding to their forward end and at a second position substantially midway the ends of said heads; an intake manifold for said engine comprising opposite flange portions for mounting said manifold on said seating faces, a central portion comprising a pair of air-fuel intake risers each terminating at its lower end in a distribution zone, and a liquid coolant compartment jacketing said distribution zones, liquid coolant intake conduits extending transversely of said manifold between said central portion and said flange portions and defining liquid coolant passages connecting opposite sides of said liquid coolant compartment with the said passage means of said galleries at said midway position, liquid coolant return conduit means extending longitudinally of said manifold from said central portion thereof to adjacent the end of said manifold corresponding to the forward end of said cylinder heads, said liquid coolant return conduit having an outlet and defining a liquid coolant return passage between said compartment and said outlet, and bleed conduit means adjacent said forward end of said manifold extending transversely of said manifold between said return conduit means and said flange portions and defining passage means between said return conduit means and said forward gallery passage means at said mounting faces.

7. An intake manifold as claimed in claim 5 wherein said bleed passage means are smaller in section than said intake passages.

8. An intake manifold as claimed in claim 5 wherein said bleed conduit means comprises a tubular passage of relatively small section.

9. An intake manifold as claimed in claim 5 wherein said bleed conduit means defines a pair of tubular passages one on each side of the manifold.

No references cited.